United States Patent [19]

Gallagher

[11] 3,969,431

[45] July 13, 1976

[54] REINFORCEMENT OF VINYL CHLORIDE RESINS WITH SUSPENSION EMULSION INTERPOLYMERS

[75] Inventor: Ruth E. Gallagher, Dobbs Ferry, N.Y.

[73] Assignee: Stauffer Chemical Company, Westport, Conn.

[22] Filed: Nov. 13, 1973

[21] Appl. No.: 415,464

Related U.S. Application Data

[63] Continuation-in-part of Ser. No. 182,165, Sept. 20, 1971, abandoned, which is a continuation-in-part of Ser. No. 101,155, Dec. 23, 1970, abandoned.

[52] U.S. Cl. ............... 260/876 R; 260/29.7 UP; 260/884; 260/885
[51] Int. Cl.$^2$ ............... C08L 51/06; C08L 27/06; C08L 31/02
[58] Field of Search ......... 260/884, 885, 899, 876 R

[56] References Cited
UNITED STATES PATENTS

| | | |
|---|---|---|
| 3,334,156 | 7/1967 | Calentine et al. ............... 260/884 |
| 3,426,101 | 2/1969 | Ryan et al. ............... 260/876 |
| 3,657,172 | 4/1972 | Gallagher et al. ............ 260/29.6 RB |
| 3,660,529 | 5/1972 | Groch ............... 260/876 R |
| 3,673,283 | 6/1972 | Tanaka et al. ............... 260/898 |
| 3,697,620 | 10/1972 | Ermidis ............... 260/836 |
| 3,760,035 | 9/1973 | Kelley ............... 260/876 |
| 3,776,982 | 12/1973 | Nicolet et al. ............... 260/884 |
| 3,832,318 | 8/1974 | Gallagher et al. ............ 260/29.7 UP |

*Primary Examiner*—Murray Tillman
*Assistant Examiner*—Thurman K. Page
*Attorney, Agent, or Firm*—Richard P. Fennelly

[57] ABSTRACT

Rigid vinyl chloride polymers are reinforced by admixture with a plurality of elastomer-containing interpolymer particles which are prepared by the suspension polymerization of vinyl chloride in the presence of an aqueous emulsion of particles comprising a crosslinked butyl acrylate/2-ethylhexyl acrylate acrylic elastomer having a Tg of less than about 25°C. The resulting reinforced vinyl chloride polymers display excellent physical properties.

9 Claims, No Drawings

3,969,431

REINFORCEMENT OF VINYL CHLORIDE RESINS WITH SUSPENSION EMULSION INTERPOLYMERS

RELATED APPLICATIONS

This application is a continuation-in-part of application Ser. No. 182,165, filed Sept. 20, 1971 which in turn is a continuaton-in-part of application Ser. No. 101,155, filed Dec. 23, 1970, both now abandoned.

BACKGROUND OF THE INVENTION

It is a common practice to reinforce polyvinyl chloride with particles of elastomers such as polybutadiene and the polyacrylates. The addition of elastomer improves impact strength, i.e., the ability to withstand a rapidly applied shock. While the addition of elastomer improves impact strength, other physical properties such as tensile strength, clarity, heat distortion temperature, hardness and aging stability are, however, adversely affected by the elastomer.

A procedure which is often used to reinforce rigid, brittle polymers involves preparing the plastics in the presence of elastomers. The products resulting from such polymerization procedures, which are referred to as interpolymers or graft copolymers, normally have elastomer contents of about 20-60%. These high elastomer content materials are employed as so-called "impact modifiers" by being blended with brittle plastics in order to enhance their impact strength. The elastomer content of these blends is generally about 5-20%. for example, U.S. Pat. No. 3,632,679 teaches improving impact resistance of PVC by incorporation therein of composite macro-granules comprising rubber $C_2$-$C_4$ alkyl acrylate particles in a PVC matrix.

TECHNICAL DISCLOSURE OF THE INVENTION

In brief, the novel process of this invention comprises a means for reinforcing rigid vinyl chloride polymers with a novel modifier as described hereinbelow.

In brief, this novel modifier is prepared by means of a process which comprises the suspension polymerization of vinyl chloride, or a mixture of vinyl chloride with a minor proportion of one or more comonomers, in the presence of an aqueous emulsion of (50–70)/(-50–30) butyl acrylate/2-ethylhexyl acrylate essentially crosslinked elastomer particles. This process yields particles of what may be termed as "suspension-emulsion interpolymer" (SEI) particles in which microscopic examination reveals that the polymer of the suspension polymerized vinyl monomer, i.e. the polyvinyl chloride, surrounds and/or is intimately dispersed throughout the mass of the essentially crosslinked elastomer particles. This phenomenon apparently results from the fact that the vinyl chloride monomer, which is used for the final suspension polymerization step, has partially swollen the elastomer particles prior to polymerizing. THe resulting particles, having been prepared by means of a suspension process, are in the form of agglomerates which have a particle size that is substantially greater than that of the original rubber emulsion particles utilized in their preparation. As a result, these SEI particles are far easier to dry and to handle than are these elastomeric emulsion polymer particles. Moreover, they provide superior results as high impact plastics and as modifiers for the reinforcement of rigid PVC wherein they impart excellent impact strength without substantially detracting from any other physical properties. Thus, as used in this disclosure, the term "interpolymer" denotes a product resulting from the polymerization of vinyl chloride, optionally in the presence of one or more monomers and in the presence of a previously prepared essentially crosslinked copolymer butyl acrylate and 2-ethylhexyl acrylate.

Because of the high elastomer content in the novel modifiers of this invention which is in the range of from about 2–80%, by weight, only small quantities of these impact modifiers are required in order to improve the impact strength of a brittle plastic. Thus, when being blended with polyvinyl chloride, their use in a concentration as low as about 5 phr can be effective, i.e., 5 parts of elastomeric SEI as disclosed in this invention in 100 parts by weight of polyvinyl chloride. Thus, the prior art, as exemplified by German Patent No. 1,090,857 and U.S. Pat. No. 3,488,406, teaches the preparation of an impact modified polyvinyl chloride containing about 2–20%, by weight, of acrylic elastomer which is prepared by means of a similar interpolymerization type process. However, unless such special techniques as are set forth in this disclosure are employed, the high elastomer concentration necessary to yield efficient impact modifiers cannot be attained under practical conditions by the use of the prior art techniques.

The interpolymer product of this invention exhibits improved heat stability, weatherability, and oxidative stability over impact modifiers which are based on polybutadiene type rubbers, e.g., ABS and MBS type additives. This improvement results from the fact that the polybutadiene rubbers contain residual unsaturation which is susceptible to oxidation so that the impact modifiers based upon such rubbers must almost always be stabilized with from about 0.2–3% of an expensive antioxidant. By contrast, the modifiers of this invention contain an acrylic type elastomer which resists oxidative degradation and therefore requires the addition of little, if any, additional antioxidants. Thus, the SEI product of this invention is particularly suitable for outdoor uses since it undergoes little, if any, discoloration during either processing or aging whereas many ABS and MBS type products lose their effectivenesss on aging. The interpolymer product imparts excellent low temperature properties to PVC as compared with SEI polymers having less than 20% 2-ethylhexyl acrylate copolymerized with butyl acrylate.

In order for an impact modifier to impart impact resistance to PVC, it must, to a certain extent, be compatible therewith, i.e., it must "adhere" to the PVC. Absent such compatability, a material will tend to weaken PVC rather than increase its impact resistance. Since, as a rule, polymers are not compatible with each other as stated in Principle of Polymer Chemistry by P. J. Flory, Cornell University Press, 1953, p. 555 that "imcompatibility of chemically dissimilar polymers is observed to be the rule and compatibility is the exception", therefore it is truly surprising that such dissimilar polymer as the crosslinked (50–70) butyl acrylate/(50-30) 2-ethylhexyl acrylate provided by this invention is compatible with PVC and improves its impact resistance.

It should also be noted that the suspension-emulsion interpolymerization process which is used to prepare the impact modifiers to this invention has distinct advantages over the methods heretofore used to prepare other impact modifiers. Thus, most impact modifiers sare prepared by means of graft emulsion polymerization procedures in which the resulting graft copolymer emulsions must then be coagulated with brine or spray dried. On the other hand, in the process of this invention, the vinyl chloride is suspension polymerized yielding a granular product which is readily filtered free of water and then air dried. The need for a separate isolation step for the polymer is thereby eliminated. In addition, the product is substantially free of ionic impurities and emulsifiers which tend to impair its heat stability.

In the preferred embodiment of this invention, the SEI particles are blended or diluted with a homo- or copolymer of vinyl chloride which has been prepared by means of a conventional aqueous suspension polymerization process. Application vinyl chloride copolymers include copolymers of vinyl chloride together with a minor proportion of one or more of such vinyl monomers as the alpha-olefins such as ethylene, propylene and butylene; vinyl esters of carboxylic acids such as vinyl acetate, vinyl benzoate, vinyl butyrate, and vinyl stearate; vinylidene halides such as vinylidene chloride; the $C_1$-$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic acid and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$-$C_{20}$ mono- and dialkyl esters such as aconitic acid, fumaric acid, maleic acid, itaconic acid, citraconic acid, maleic anhydride; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$-$C_{20}$ alkyl vinyl ethers such as methyl vinyl ether, ethyl vinyl ether and stearyl vinyl ether; dienes such as isoprene and butadiene; and, any other vinyl monomers copolymerizable with vinyl chloride. Of this group, vinyl esters such as vinyl acetate are preferred. The resulting products are found to have improved physical properties as evidenced by their superior impact strength which is achieved without any substantial reduction in their tensile strength.

In greater detail, now, the elastomer particles which are utilized in preparing the novel SEI particles of this invention are made by means of conventional aqueous emulsion procedures well known to those skilled in the art using emulsifiers and water soluble catalysts.

Thus, in conducting the aqueous emulsion polymerization step leading to the preparation of these elastomer particles, there is first prepared a monomer charge comprising an aqueous emulsion containing about 10–50%, by weight, of one or more monomers the identity of which will be described in detail hereinbelow. From about 0.05–2.0%, by weight of the monomer mixture, of a water soluble catalyst such, for example, as ammonium, sodium or potassium persulfate, hydrogen peroxide or a redox system such as a mixture of a persulfate with an alkali metal bisulfite, thiosulfate or hydrosulfite is introduced and the mixture is then heated at a temperature of from about 40° to 95°C. for a period of about 0.5 to 8 hours. The emulsion should also contain from about 0.2–2.0%, by weight of the total monomer charge, of one or more suitable emulsifiers as described hereinbelow.

Thus, it has been found that optimum results are obtained by the use of emulsifiers which are at the extreme ends of the "HLB" Classification scale as described, for example, in the article entitled "EMULSIONS", by W. C. Griffin which appears in the Encyclopedia of Chemical Technology, Vol. 8, Second Edition, pages 117–134, 1963. Thus, the "HLB" scale, of from 0–50, can be defined as an expression of the relative simultaneous attraction of an emulsifier for water and for oil. It would appear to be determined by the chemical composition and the extent of ionization of a given emulsifier. For example, a propylene glycol monostearate has a low HLB value, i.e., it is strongly lipophilic, while a polyoxyethylene monostearate having a long polyoxyethylene chain has a medium HLB value, i.e., it is moderately hydrophilic. And, at the other end of the "HLB" scale, for example, is sodium stearate which has a very high HLB value, i.e., it is hydrophilic, since it ionizes and thus provides an even stronger hydrophilic group.

It has been found that the use of those surfactants which are at the extreme ends of the HLB scale results in the formation of large latex particles in the range of from about 0.1–0.8 microns which are highly desirable for use in carrying out the process of this invention. Typical of this group of surfactants are the sulfosuccinates, specifically the $C_{13}$ bis(tridecyl) ester of sodium sulfosuccinic acid which exhibits an HLB value of about 4–7. This surfactant yields the desired large particle size latices in a "one shot" polymerization process, i.e., a process which does not require incremental addition of the surfactant charge. However, as the chain length of the alkyl ester groups in a sulfosuccinate surfactant is reduced to a length of about 6–8 carbon atoms, the HLB value increases to a range of from about 20–40 and the latex particles which are produced will be undesirably small, i.e., in the range of from about 0.06–0.1 microns. Similarly, with respect to the alkyl sulfate surfactants, the $C_{16}$ sodium cetyl sulfate will, for example, yield an undesirable small particle size of from about 0.06–0.1 microns while an alkyl sulfate salt with a short $C_8$ alkyl group, particularly sodium-2-ethylhexyl sulfate, has a higher HLB value of about 50 and yields a latex having the desired large particle size of from about 0.1 to 0.8 microns. Thus, it may be concluded that the applicable surfactants for use in the emulsion polymerization step of the process of this invention should have an HLB value of either about 2 to 12 or greater than about 40. Moreover, the use of surfactants with HLB values which are not at the extreme ends of the scale also tends to cause plate out during the subsequent suspension polymerization step. This undesirable phenomenon will be discussed in greater detail hereinbelow.

Accordingly, the use of emulsifiers within the above range of HLB values has been found to lead to the preparation of the SEI elastomer particles of this invention in a desirably large particle size of from about 0.1–0.8 microns by means of a highly convenient procedure as opposed to the involved techniques described in the prior art for the preparation of products of this type. Thus, for example, in U.S. Pat. No. 3,488,406, it is seen that the polymerization of rubber polymer particles using an emulsifier which is only moderately hydrophobic requires the separate, incremental addition to the system of the monomers and of the catalyst over the rather extended period of ten hours. By contrast, the use of emulsifiers having the above-specified HLB values in the process of this invention permits the convenient preparation of the large size elastomer particles by means of a procedure in which, in contrast to the teachings of the prior art, all of the surfactant can be added to the system at one time and in which the entire process is completed in from about one to three hours.

Moreover, in a preferred embodiment of the process of this invention, it has been found that regardless of the particular emulsifier being utilized in preparing the elastomer latex, its polymerization in large scale commercial equipment is greatly facilitated by introducing the monomer charge to the system in about three equal portions over a period of from about 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about three equal portions, the resulting polymerization reaction remains controllable and overheating and coagulation can be prevented.

The acrylic elastomer particles used in preparing the SEI particles of this invention comprises a crosslinked acrylic copolymer having a Tg, i.e., a glass transition temperature of less than about 25°C., said copolymer resulting from free radical initiated emulsion polymerization of a mixture of butyl acrylate and 2-ethylhexyl acrylate in a 50–70 to 50–30 proportion. These acrylic elastomer particles should be crosslinked so that they can retain their size and shape during subsequent polymer processing steps. This crosslinking can be achieved during the polymerization of the acrylic monomers if at least one polyfunctional ethylenically unsaturated monomer is included in the polymerization recipe. As used in this disclosure the term "crosslinked" denotes a polymer which at ambient temperatures is substantially insoluble in such organic solvents as tetrahydrofuran or cyclohexanone.

Crosslinking is effected by the presence of small quantities, i.e., 0.2–10% (based on the weight of the acrylate monomers) of a polyfunctional ethylenically unsaturated monomer, i.e., a monomer containing at least two ethylenically unsaturated groups such, for example, as allyl methacrylate, divinyl benzene, diethylene glycol dimethacrylate, ethylene glycol dimethacrylate, trimethylolpropane trimethacrylate, methylene-bis-acrylamide, diethylene glycol diacrylate, ethylene glycol diacrylate, divinyl ether, diallyl fumarate, diallyl phthalate, divinyl sulfone, divinyl carbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetraacrylate ester of pentaerythritol and various diallyl lphosphates. Preferred for this purpose, however, is 1,3-butylene glycol diacrylate.

The next step in the process of preparing SEI particles involves the suspension polymerization of a monomer charge comprising vinyl chloride in the presence of the aqueous emulsion of elastomer particles whose preparation has been described hereinabove. In addition to vinyl chloride, one may also use a monomer charge comprising a mixture of vinyl chloride with a minor proportion of one or more additional vinyl monomers other than vinyl chloride including the vinyl esters such as vinyl acetate, vinyl phosphates such as bis(beta-chloroethyl) vinylphosphonate, vinylidene halides, olefins, alkyl vinyl ethers and the ethylenically unsaturated dicarboxylic acids, their anhydrides and their $C_1$–$C_{18}$ mono- and dialkyl esters. A more complete listing of these vinyl monomers is included in the preceding description of the preferred embodiment of this invention involving the blending of the SEI particles with polyvinyl chloride. It is preferred to employ vinyl chloride as the sole monomer during this suspension polymerization step.

In conducting the suspension polymerization, the vinyl chloride or the mixture of vinyl chloride with one or more comonomer is added to the previously prepared aqueous emulsion of the elastomer polymer particles in a concentration of about 20 to 90%, by weight, of the latter elastomer particles. Also required to be admixed with the aqueous emulsion of the elastomer polymer particles is a concentration of from about 0.05 to 1.0%, as based on the total weight of the vinyl chloride monomer or monomer mixture which has been added to the aqueous emulsion of the elastomer particles, of a suspending agent such, for example, as methyl cellulose, hydroxyethyl cellulose, hydroxypropyl cellulose, carboxymethyl cellulose, talc, clay, polyvinyl alcohol, gelatine and the like. Preferred for this purpose is hydroxypropyl methyl cellulose which should, preferably have a viscosity of at least about 3,000 and, preferably, about 15,000 cps. as determined, at 20°C., with a 2%, by weight, aqueous solution of the polymer in a Ubbelohde viscometer according to ASTM Procedures D-1347-64 and D-2363-65T. This same procedure is used in determining the viscosity of the various grades of this suspending agent whose use is subsequently described in this disclosure.

Thus, the use of the latter suspending agent has been found to provide for an extremely clean reaction system. More particularly, the use, as a suspending agent, of hydroxypropyl methyl cellulose having the above-specified molecular weight requirements is found to virtuallly eliminate the phenomenon of plate out in the suspension polymerization step of the process of this invention whereas the use of other suspending agents often leads to a significant degree of plate out. Thus, as is known to those skilled in the art "plate out" refers to the undesirable formation of a skin or film of polymer on the reactor wall. Needless to say, this skin presents a serious problem since it must be removed prior to any subsequent usage of the reactor inasmuch as it interfers with proper heat transfer during polymerization. Therefore, the discovery that the use of a certain molecular weight grade of hydroxypropyl methyl cellulose lead to the virtual elimination of plate out in this process represents a substantial improvement over the prior art process for preparing SEI particles such, for example, as described in German Patent 1,090,857, since the need for having to clean the reactor between runs, particularly in large commercial reactors, is an expensive and time consuming procedure.

In addition, the use of the above-described grade of hydroxypropyl methyl cellulose results in the attainment of a satisfactory bulk desity and particle size distribution on the part of the resulting SEI particles. As will be explained in greater detail hereinbelow, the attainment of each of the latter two chacteristics, i.e., satisfactory bulk density and particle size distribution, is a factor of vital significance in the process of the subject invention.

In addition, a monomer soluble catalyst or initiator such, for example, as azobisisobutyrontrile, lauroyl peroxide, benzoyl peroxide or isopropylperoxy dicarbonate should be present in a concentration of from about 0.2 to 1.0%, by weight, of the vinyl chloride monomer or monomer mixture that has been added to the elastomer emulsion. It has also been found that adjusting the pH of the polymer latex to a level within the range of from about 3–9 has the effect of improving its mechanical stability and also serves to produce a clean reaction during the subsequent suspension polymerization step. This pH adjustment may be readily accomplished by the addition, to the emulsion, of the requisite quantity of a basic solution such, for example, as an aqueous solution of sodium carbonate of bicarbonate or of sodium hydroxide.

Polymerization may then be initiated by heating the above-described recipe at a temperature in the range of from about 45° to 75°C. and for a period of from about 2 to 12 hours with agitation being applied througout the course of the reaction. The resulting product is an aqueous suspension of SEI particles wherein the supernatant fluid is completely devoid of any of the original rubber polymer emulsion. The total SEI particle solids content of these suspensions will be in the range of from about 20 to 50%, by weight. Each of these SEI particles comprise, in effect, a particle of an elastomer prepared by means of an emulsion polymerization procedure having a vinyl chloride suspension polymer which has been polymerized onto the elastomer particles by means of a suspension polymerization step so that it surrounds and/or is homogeneously dispersed throughout the mass of the crosslinked acrylic elastomer emulsion polymer particle. The extent to which this vinyl chloride suspension polymer will surround and/or be dispersed within the mass of the crosslinked acrylic elastomer emulsion polymer particle will, of course, be determined by the particular monomers which are utilized in the suspension polymerization step as well as by the particular polymer which comprises the crosslinked acrylic elastomer polymer fraction.

Thus, in these SEI particles, the crosslinked acrylic elastomer emulsion polymer may be present in a concentration of from 2.0 to 80%, by weight; said elastomer particles having the suspension polymer surrounding and/or homogeneously dispersed therein; the later proportions being based on the total weight of the SEI interpolymer particles. Preferred products should contain from about 30 to 55%, by weight, of the crosslinked acrylic elastomer emulsion polymer and about 55 to 70%, by weight, of the vinyl chloride suspension polymer surrounding and/or homogeneously dispersed throughout the mass of said elastomer emulsion polymer.

It is important, with respect to this disclosure, to distinguish between the processes of suspension and emulsion polymerization.

Thus, suspension polymerization refers to a method of polymerization whereby one or mroe monomers is dispersed in a suspension medium which is a non-solvent for both the monomer and the resulting polymer. Generally water is utililzed for this purpose and a monomer soluble, i.e., an oil soluble, polymerization initiator is thereupon introduced. Polymerization takes place within the monomer phase containing the polymerization initiator. The use of the suspending medium assists in the dissipation of the heat of polymerization and consequently the molecular weight of the resulting polymer is therefore easier to control. Suspension polymerization is generally accomplished by dispersing the monomer in the suspending medium either by constant agitation or by the use of a suspending agent or both. Various suspending agents are known in the art such, for example, as gelatine, hydroxymethyl cellulose, hydroxyethyl cellulose, methyl cellulose, carboxymethyl cellulose, talc, clay, polyvinyl alcohol and the like.

by contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, alkali metal and ammonium salts of long-chain carboxylic and sulfonic acids; alkylated aromatic sulfonic acids and quaternal salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecule or is solubilized in the soap micelle which is present in aqueous soap solutions. As a result, stable polymer emulsions are readily obtained whereas, in a suspension polymerization, the resulting polymer particles are of a relatively large mass which tend to more readily separate out from the suspension.

A preferred procedure for carrying out the process of this invention involves the preparation of the crosslinked acrylic elastomer latex in the same reactor in which the vinyl chloride polymer will subsequently be polymerized. This avoids the need for subsequently removing the polymer latex from the reactor in which it was originally prepared and then introducing it into a different reaction vessel.

The SEI particles resulting from the process of this invention should desirably have a particle size in the range of from about 10 to 200 microns and can, therefore, be readily recovered, as by filtration on a Buchner funnel or similar apparatus, and thereupon simply air dired. There is no need for the use of a costly and time-consuming spray drying or coagulation procedure as is usually required for the isolation, on a large scale commercial basis, of the rubber polymer particles from which these SEI particles are themselves prepared. These SEI particles should also have a bulk density of at least about 0.2 and preferably about 0.3–0.4 gm/cm$^3$ as determined, for example, by ASTM D-1895. The possession, by the SEI particles, of the above-stated particle size and bulk density characteristics is highly advantageous with respect to their subsequent admixture with ordinary polyvinyl chloride; the preparation of such blends, as has been noted hereinabove, being one of the preferred embodiments of this invention.

The SEI particles may be dispersed in the selected vinyl chloride polymer by means of any convenient procedure which will result in an intimate admixture of the SEI particles within the mass of the substrate polymer. This may be accomplished by mill blending or by blending the SEI particles with the substrate while both are in the form of solid powders. With respect to proportions, the resulting blends should contain a sufficient concentration of the SEI particles so that from about 0.5 to 30%, by weight, of elastomer derived from the SEI particles is present therein.

When added to polyvinyl chloride at a 2 to 20% by weight level, as based on the total weight of elastomer derived from the SEI particles which is present in the resulting mixture, an increase in the impact strength of the polyvinyl chloride is obtained along with improved processability.

The blending or the dilution of the SEI particles with polyvinyl chloride or a vinyl chloride copolymer may be accomplished by diluting or blending the original aqueous suspension in which the SEI particles were polymerized with a homo- or copolymer of vinyl chloride which may be in bulk, solution, suspension or emulsion form; or, it may involve the addition of the dried, isolated SEI particles to a dried suspension of the polymer diluent. For example, a polyvinyl chloride-SEI blend containing 30% elastomer derived from the SEI particles can be mixed in the proportions from about 1:1 to 1:60 with regular, unmodified polyvinyl chloride to yield a product containing 0.5 to 17%, by weight, of elastomer derived from the SEI particles. For optimum results, these blends should contain from about 3 to 90%, by weight, of the SEI particles. Products prepared from the latter blends are found to have improved physical properties, particularly with respect to their impact strength, without any substantial loss in the tensile strength.

Thus, by diluting the SEI polymer particles in this manner, it has been found that it is possible to start with SEI particles having a given concentration of elastomer which, subsequent to dilution with a polymer such as PVC, will generally yield a product whose impact strength is comparable to the original SEI material despite its reduced, overall elastomer content while its tensile strength is also ordinarily improved.

The following examples will further illustrate the embodiments of this invention. In these examples, all parts given are by weight, unless otherwise noted. In addition, it is to be pointed out that the glass transition temperature of all of the elastomers described in these examples is less than 25°C.

EXAMPLE I

This example illustrates the preparation of SEI particles by means of the process of this invention and their subsequent use as an impact modifier for PVC.

Part 1

Preparation of an n-Butyl Acrylate/2-Ethylhexyl Acrylate:1,3-Butylene Dimethacrylate Copolymer Latex 264 gms H$_2$O
50 ml of a 1%, by weight, aqueous solution of the bis(tridecyl) ester of sodium sulfosuccinic acid having an HLB value of ~ 4 to 7
33 ml of a 2%, by weight, aqueous solution of potassium persulfate
3.3 gms 1,3-butylene dimethacrylate
113.5 gms n-butyl acrylate
48.5 gms 2-ethylhexyl acrylate By means of this procedure, an emlsion having 30%, by weight, of resin solids is obtained wherein the copolymer particles have a particle size of about .29 microns.

Part 2

Preparation of a 70/30 PVC/n-Butyl Acrylate/2-Ethylhexyl Acrylate:1,3-Butylene Dimethacrylate Interpolymer The following ingredients are placed into a 1 quart bottle which is capped, heated and rotated at 38 RPM for 8 hours at 60°C.:

70 gms vinyl chloride
100 gms of the latex whose preparation is described in Part 1
200 gms H$_2$O
0.075 gms azobisisobutyronitrile
40 ml of a 1%, by weight, aqueous solution of polyvinyl alcohol A granular white powder is obtained which is air dried. These SEI particles have an average particle size of 100 microns and a bulk density of at least 0.2 gm/cm$^3$.

Part 3

Use of the 70/30 Interpolymer as an Impact Modifier for PVC

Varying proportions of the above-described interpolymer particles are intimately admixed with a commercially available polyvinyl chloride resin so that the resulting blends contain 5, 10 and 15%, by weight, respectively of elastomer derived from the SEI particles. These blends are prepared using a two-roll mill, operating at 350°–360°F., for a period of three minutes. As stabilizers, each sample contained 3 phr of a tin mercaptide sold as "THERMOLITE 31" by M & T Chemicals, Inc. and 0.5 phr of calcium stearate. The following table describes the composition of the various samples which are evaluated as well as the result obtained.

| Sample No. | Con. of Elastomer (Derived From The SEI Particles Added To the PVC) | Izod Impact Strength (Ft lbs/sq in)[1] |
|---|---|---|
| Control | 0 | 0.2 |
| 1 | 5 | 8 |
| 2 | 10 | 18 |
| 3 | 15 | 24 |

[1]ASTM Procedure D-256-56

The above data clearly illustrate the improved impact characteristics imparted to PVC upon its admixture with the SEI particles of this invention.

Variations may be made in proportions, procedures and materials without departing from the scope of this invention as defined in the following claims.

What is claimed is:

1. A composition comprising an intimate admixture of:
    a. a rigid polymer of vinyl chloride; and
    b. interpolymer particles which consist essentially of (i) an emulsion acrylate copolymer of 50 to 70% butyl acrylate and 50% to 30% 2-ethylhexyl acrylate which has been crosslinked by from about 0.2% to 10%, by weight of said acrylates, of a monomer containing at least two ethylenically unsaturated groups and (ii) a vinyl chloride polymer which has been suspension polymerized in the presence of said acrylate copolymer and which surrounds and/or is homogeneously dispersed within the mass of said crosslinked acrylate copolymer.

2. The composition of claim 1, wherein said crosslinked acrylic elastomer emulsion polymer comprises from about 2 to 80%, by weight, thereof.

3. The composition of claim 1, wherein the acrylic elastomer emulsion polymer is crosslinked with a polyfunctional ethylenically unsaturated monomer selected from the group consisting of 1,3-butylene glycol diacrylate, 1,3-butylene glycol dimethacrylate, ethylene glycol dimethacrylate, diethylene glycol dimethacrylate, triethylene glycol dimethacrylate and trimethylol propane trimethacrylate.

4. The composition of claim 1, wherein said vinyl chloride suspension polymer is selected from the group consisting of polyvinyl chloride and copolymers of vinyl chloride with a minor proportion of at least one other vinyl monomer.

5. The composition of claim 4, wherein said vinyl chloride suspension polymer is polyvinyl chloride.

6. The composition of claim 1, wherein said rigid polymer of vinyl chloride is polyvinyl chloride.

7. Interpolymer particles which consist essentially of (i) an emulsion acrylate copolymer of 50 to 70% butyl acrylate and 50% to 30% 2-ethylhexyl acrylate which has been cross-linked by from about 0.2% to 10%, by weight of said acrylates, of a monomer containing at least two ethylenically unsaturated groups and (ii) a vinyl chloride polymer which has been suspension polymerized in the presence of said acrylate copolymer and which surrounds and/or is homogeneously dispersed within the mass of said crosslinked acrylate copolymer.

8. The composition of claim 7 wherein the copolymer is crosslinked with 1,3-butylene glycol diacrylate.

9. The composition of claim 7 wherein the n-butyl acrylate and 2-ethylhexyl acrylate are in a ratio of 70 to 30 on a weight basis.

* * * * *